Aug. 8, 1967      H. SCHIMPF      3,334,602
SLIDE OPERATING DEVICE ON SHUTTLE EMBROIDERY MACHINE
Filed Oct. 20, 1965      3 Sheets-Sheet 2
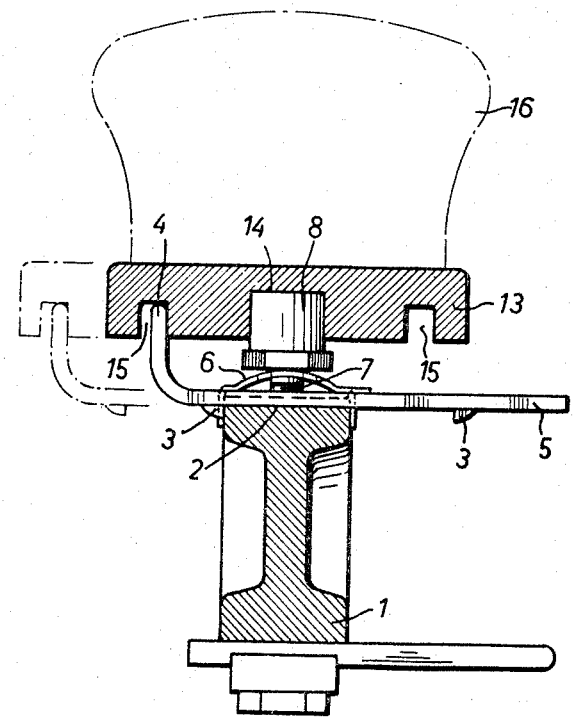
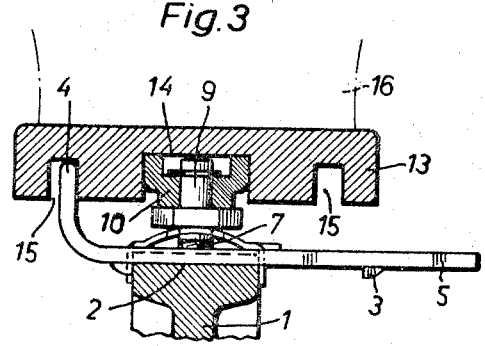
INVENTOR
HERMANN SCHIMPF
BY
Abraham A. Saffitz
ATTORNEY INVENTOR
HERMANN SCHIMPF
BY
Abraham A. Saffitz
ATTORNEYS

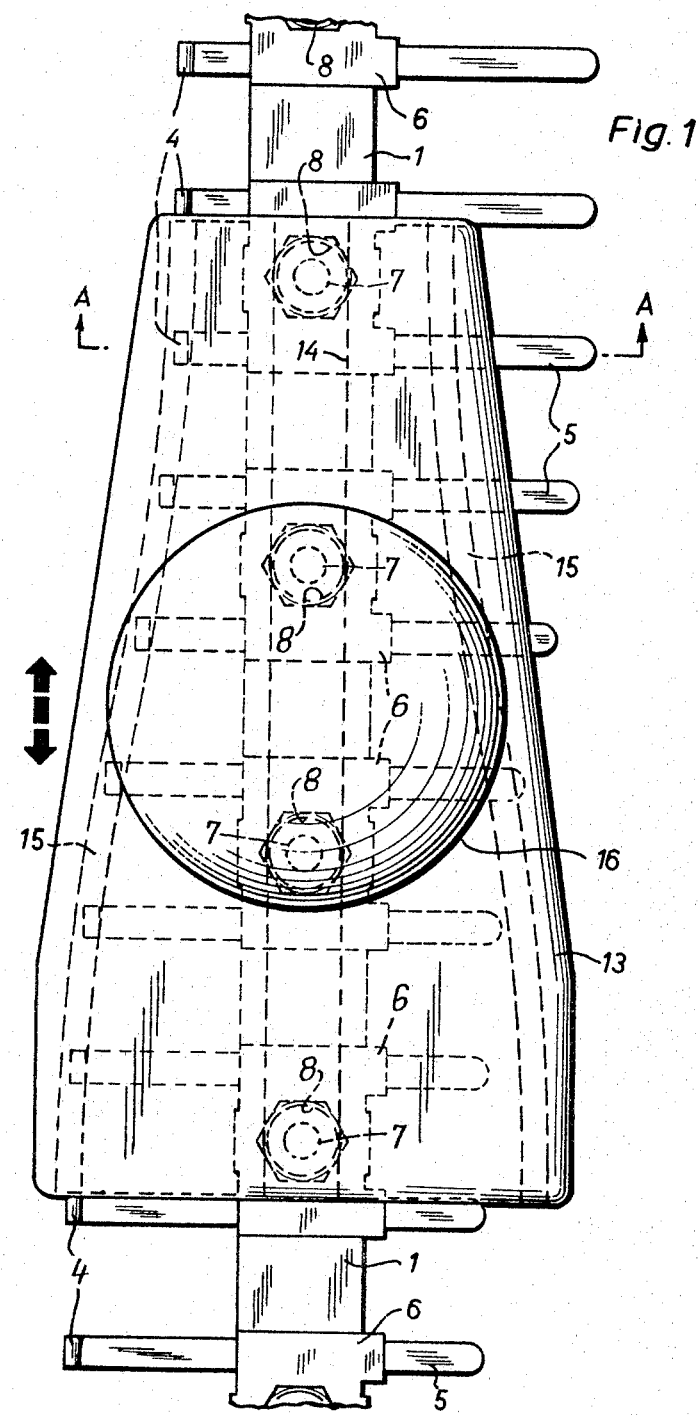

United States Patent Office 3,334,602
Patented Aug. 8, 1967

3,334,602
SLIDE OPERATING DEVICE ON SHUTTLE
EMBROIDERY MACHINE
Hermann Schimpf, Arbon, Switzerland, assignor to
Adolph Saurer Ltd., Arbon, Switzerland
Filed Oct. 20, 1965, Ser. No. 498,896
Claims priority, application Switzerland, Nov. 3, 1964,
14,173/64
4 Claims. (Cl. 112—95)

This invention relates to a novel device on a shuttle embroidery machine to operate the machine slides which are arranged on the driver bar of the machine, the novel operating device extending along the entire stitching length of the machine.

In the operation of one type of commercially available embroidery machine, as for example Saurer U.S. Pat. No. 1,347,232, it is commonly recognized that the slides on the driver bar must be moved individually, by hand, in order to exchange those shuttles which have run out of yarn. Another slide arrangement concurrently in use comprises a bar with slides in which the slides are pulled back simultaneously with the bar. The first device is tedious to use and is time-consuming, while the second device requires a great deal of force and physical exertion which is an important disadvantage for embroidery machine operation.

The above-mentioned disadvantages are obviated in the present invention by means of a novel sliding carriage which is guided longitudinally on top of the driver bar and which is provided in the novel mounting structure with at least one curved operating guideway for the operation of the slides. This curved operating guideway approaches the sliding carriage guide longitudinally, and withdraws from the same guide in the longitudinal direction so that a predetermined displacement of the sliding carriage will effect the opening or the closing, respectively of the slides. The top of the driver bar is provided with a guiding device for the sliding carriage, and the bent end part of the slide is inserted into the curved slide operating guideway of the sliding carriage. The guiding device is mounted on top of the driver bar by means of individual screw bolts placed in line one behind the other but the mounting may be modified to comprise rollers mounted on the individual screw bolts.

The object of the invention is illustrated in the accompanying drawings.

FIG. 1 is a top plan view of a section of the driver bar with slides, slide springs and sliding carriage;

FIG. 2 illustrates a cross section of line A—A of FIG. 1;

Figure 4:
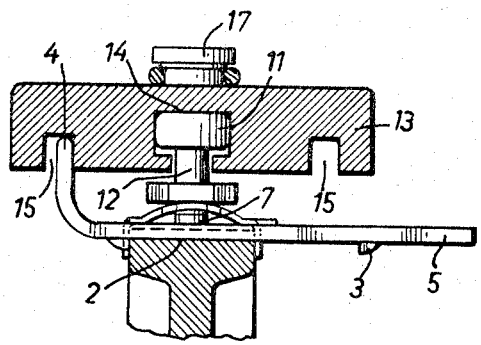
Figure 5:
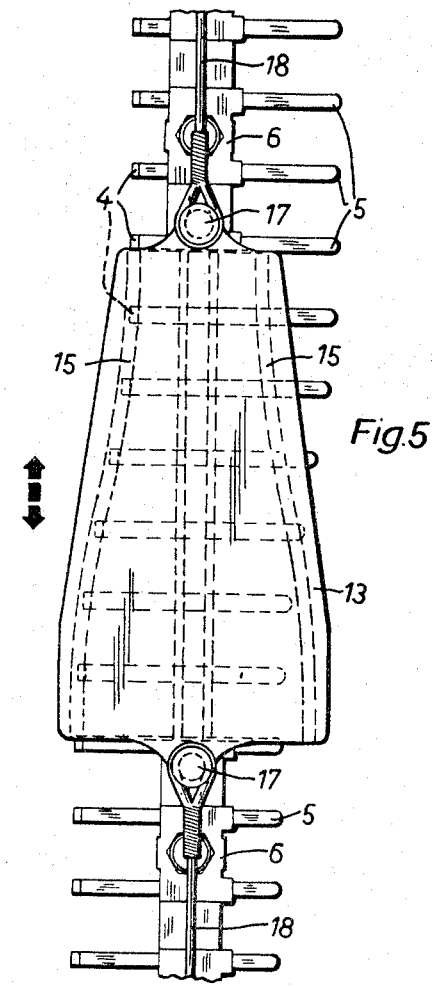

FIG. 3 and FIG. 4 also show cross sections of line A—A corresponding to FIG. 2, but of varying executions; and FIG. 5 is a top plan view of a section of the driver bar with a different type of sliding carriage actuation as compared to FIGS. 1–3.

The driver bar 1 which extends along the entire stitching length of the shuttle embroidery machine, contains in corresponding guide slots 2 the slides 5 which have a stop contact 3 and a bent end part 4. As is commonly known, the slides 5 serve as safeties for the proper position of the shuttles (not illustrated).

The dotted line in FIG. 2 illustrates the position designated as "opened," whereas the solid line indicates the "closed" position. Each two adjoining slides 5 are held fast in the guide slots 2 by means of a leaf spring 6. The tension of spring 6 is regulated with a screw bolt 7, which is screwed into the driver bar 1.

FIG. 2 shows that the head 8 of the screw bolt 7 has a larger diameter than the thread of bolt 7. The sliding carriage 13, illustrated in trapeze form in the top plan view, reveals on its bottom part the guide slot 14, and laterally thereto the curved slide operating guideways identified at 15. The latter approach the guide slot 14 longitudinally, or withdraw from same, respectively. The heads 8 of bolts 7, which are arranged successively, interlock with slot 14 and form guiding devices for the sliding carriage 13, the top of which has an operating handle 16. With this handle 16, the sliding carriage 13 can be displaced manually, thus making it possible to open or close the slides 5 rapidly and with little effort.

The embodiment illustrated in FIG. 3 shows bolt 7 having a part 9 with a mounted guide roller 10, instead of the head 8. In the arrangement according to FIGS. 4 and 5, the guide head 11 is connected by means of the neck 12 with the threaded part of bolt 7. Furthermore, the ends of the sliding carriage 13 are fitted with pins 17, on each of which a pulling device 18 is fastened which can be moved back and forth in commonly known manner. By displacing the sliding carriage 13 with the pulling device 18, the slides can likewise be opened and closed rapidly and with little effort.

I claim:

1. A slide operating device on a shuttle embroidery machine which is mounted on the driver bar of the machine and which extends along the entire stitching length of said machine, said device comprising a sliding carriage mounted longitudinally on said driver bar, an elongated curved operating guideway inward and adjacent the longitudinal edge of said carriage at each side thereof for operating said slides, said curved guideways enclosing and guiding said slides to approach or withdraw the slides in transverse direction to impart an opening or closing movement on the same displacement of said sliding carriage, said driver bar including on its top side guide means for limiting transverse movement of said sliding carriage, each of said slides having a bent end part which is inserted into said curved operating guideway, and fastening means for mounting the guide means on the top surface of said driver bar, said fastening means including individual screw bolts which are placed in line, one behind the other.

2. A device as claimed in claim 1, wherein the guide means arranged on the top side of the driver bar are further provided with rollers mounted on said individual bolts.

3. A device as claimed in claim 1, wherein said sliding carriage is provided with at least one operating handle at its top and at a side.

4. A device as claimed in claim 1, wherein a pulling device is fastened to an end of said sliding carriage.

References Cited

UNITED STATES PATENTS

| 990,301 | 4/1911 | Schoenfeld | 112—95 |
| 1,347,232 | 7/1920 | Saurer | 112—95 |
| 2,454,379 | 11/1948 | Fortuna et al. | 112—95 |
| 2,609,102 | 9/1952 | Henle | 112—186 X |
| 3,001,492 | 9/1961 | Linder | 112—186 |

FOREIGN PATENTS

| 279,663 | 10/1914 | Germany. |
| 80,215 | 2/1919 | Switzerland. |

JORDAN FRANKLIN, Primary Examiner.

H. F. ROSS, Assistant Examiner.